United States Patent

Yoshimura et al.

Patent Number: 4,468,041

Date of Patent: Aug. 28, 1984

[54] BACKUP RING FOR HYDRAULIC APPARATUS SEALS

[75] Inventors: Mistuo Yoshimura, Yamato; Akihisa Takaoka, Fujisawa, both of Japan

[73] Assignee: Nippon Oil Seal Industry Co., Ltd., Tokyo, Japan

[21] Appl. No.: 410,077

[22] Filed: Aug. 20, 1982

[30] Foreign Application Priority Data

Sep. 2, 1981 [JP] Japan .......................... 56-130578[U]

[51] Int. Cl.³ ............................................. F16J 9/14
[52] U.S. Cl. ................................... 277/144; 277/165; 277/188 R; 277/222
[58] Field of Search .................... 277/1, 144, 145, 165, 277/170-172, 188 R, 188 A, 216, 222

[56] References Cited

U.S. PATENT DOCUMENTS

| | | | |
|---|---|---|---|
| 3,180,649 | 4/1965 | Heygate | 277/144 |
| 3,300,225 | 1/1967 | Shepler | 277/165 |
| 3,381,970 | 5/1968 | Brown | 277/144 X |

FOREIGN PATENT DOCUMENTS 1212514 10/1959 France ...................... 277/222
56-10544 12/1981 Japan .

Primary Examiner—Robert S. Ward
Attorney, Agent, or Firm—Holman & Stern

[57] ABSTRACT

The backup ring offered by the present device is formed to be a ring-shaped body and is cut at one place thereof in the circumferential direction by a plane which is made to parallel the radius passing the central axial line of the ring-shaped body, which is inclined to the end surface of the ring-shaped body and whose point of intersection with the central axial line is located outside the ring-shaped body.

20 Claims, 10 Drawing Figures

BACKUP RING FOR HYDRAULIC APPARATUS SEALS

BACKGROUND OF THE INVENTION

The present device relates to the backup ring used in a sealing means of a hydraulic apparatus so as to prevent a packing or the like from being damaged.

Description Of The Prior Art

In a hydraulic apparatus wherein two members fitted to each other, (such as a piston and a cylinder, a piston rod and a cylinder cover, or a turning shaft and a turning table), make relative motions in the axial or circumferential direction while bearing a load supplied by hydraulic pressure, any clearance between the two members is usually blocked by inserting a packing, or the like, made of rubber-like elastic material into a circular groove cut in one of the two members conducting relative motions so as to seal the clearance between the two members. In this kind of sealing means, the backup ring, which may be made of synthetic resin, or the like, has greater strength than the material for the packing and is fitted to the back part of the packing. As a result, the packing, which is under high operating hydraulic pressure, is prevented from being caught in the clearance between the two members at the back part thereof located on the opposite side to the side where the pressure is received and from being damaged thereby.

FIG. 1 and FIG. 2 are to illustrate one example of the sealing means, respectively, for which the aforesaid backup ring is used. In the example illustrated in FIG. 1, the packing 6 made of rubber-like elastic material is inserted into a circular groove 3 cut in the inner-peripheral surface of one member 1 of the two members, which makes relative movement, in such a manner that it contacts elastically with the peripheral surface of the other member 2, so as to block the clearance 4 between the two members 1 and 2. In addition, a cut part having a nearly pentagonal section is made at the back part 7 on the opposite side to the pressure-receiving side of the packing 6, and the backup ring 10, which is made of a material having greater strength than the material for the packing 6, is inserted into the cut part so as to prevent the packing 6 from being caught in the clearance 4.

In the other example illustrated in FIG. 2, a slidable ring 11 made of a material having large abrasion resistance, such as synthetic fluororesin material, is inserted into a circular groove 3 of one member 1 in such a manner that it contacts elastically with the peripheral surface of the other member 2, so as to block up the clearance 4 between the two members 1 and 2, while a back ring 12 made of rubber-like elastic material is inserted intermediately between the slidable ring 11 and the bottom-peripheral surface of the circular groove 3 to actuate the slidable ring 11 onto the side of the peripheral surface of the other member 2. Moreover, circular vacant places having nearly square sections are formed at both end parts in the axial direction of the slidable ring 11 and the back ring 12, and the backup rings 10, made of synthetic resin material of high strength, are inserted into the circular vacant places, preventing the slidable ring 11 under the operating hydraulic pressure acting alternately on the upper and lower side surfaces illustrated in FIG. 2 from being caught in the clearance 4 and damaged.

In the aforesaid sealing means, the clearance between the backup ring 10 and the peripheral surface of the other member 2 is set to be minimal so as to protect the packing 6 or the slidable ring 11. However, a very small clearance in this case causes some difficulty in fitting one member to the other member 2. Moreover, it is difficult to insert the backup rings 10 into the circular groove 3 since the rings 10 are somewhat hard. Therefore, a construction wherein the dimension of the diameter of the ring-shaped body is made changeable by cutting a backup ring 10 in one place on the circumference thereof is employed. The cutting of the backup ring 10 has so far been made usually along a plane which contains the radius 15 passing a cut part 14 and intersects the central axial line 16 as shown in FIGS. 3 and 4. In this case, under the operating pressure, an end piece 17 having an acute angle, which is formed at the cut part 14, is pressed onto an opposite cut surface 18 under a load applied in the axial direction and blocks a clearance formed in the cut part 14, as shown by a dotted line in FIG. 4. However, since the clearance remains when the load is applied in the direction of the diameter, the packing 6 made of rubber-like elastic material (or the back ring 12 in the example in FIG. 2) is caught in the remaining clearance at its corner thickness part, thus causing a swell-out phenomenon. Because of the repeated swell-out caused by the repeated application of the pressure load, the packing 6 or the back ring 12 is damaged and eventually deprived of its sealing function.

In order to eliminate the problems in the backup ring prepared by the above prior art, a backup ring as shown in FIGS. 5 and 6 has been employed with considerably good results. Such a backup ring is disclosed in Japanese utility model application 92793/1979, published under No. 56-10544. The backup ring illustrated in FIGS. 5 and 6 is provided with a cut part 14 extended from the side of the inner periphery of a ring-shaped body to the side of the outer periphery thereof with an angle γ of inclination maintained to a tangent line 21 to the circumference of the ring-shaped body at one point. An end piece 17, having an acute angle and formed at one of two end parts holding the cut part 14 between them is pressed onto an opposite cut surface 18 under the load of pressure in the direction of the diameter so as to block a clearance formed in the cut part 14 on the side of the outer periphery. In the backup ring thus prepared, catching of the packing or the back ring under the load of pressure in the direction of the diameter is eliminated since the clearance on the side of the outer periphery disappears. However, even in this case, the packing or the back ring is sometimes damaged because it is caught in the clearance which remains on the side of inner periphery owing to the load applied in the axial direction.

SUMMARY OF THE INVENTION

The present device furnishes a backup ring employed for preventing damage to a packing in a hydraulic seal. The backup ring is formed as a ring-shaped body which is cut at one place in the direction of its circumference by a plane which is parallel to a radius and which passes through the central axis line at a point outside the ring-shaped body. Various configurations of the ring cross-section are afforded.

DETAILED DESCRIPTION OF PREFERRED EMBODIMENTS

Figure 1:
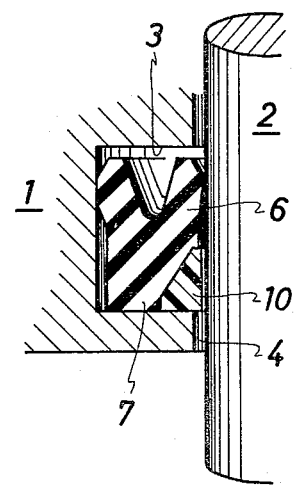
FIG. 1 and FIG. 2 are section views illustrating the structure of typical sealing means in which the backup ring of the present invention is employed.
Figure 2:
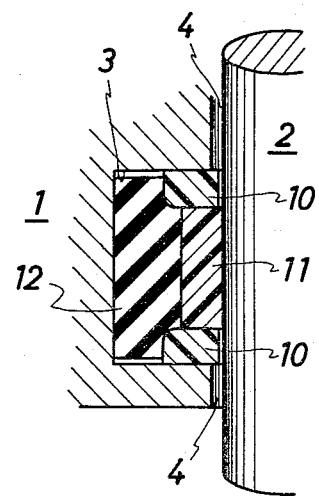
Figure 3:
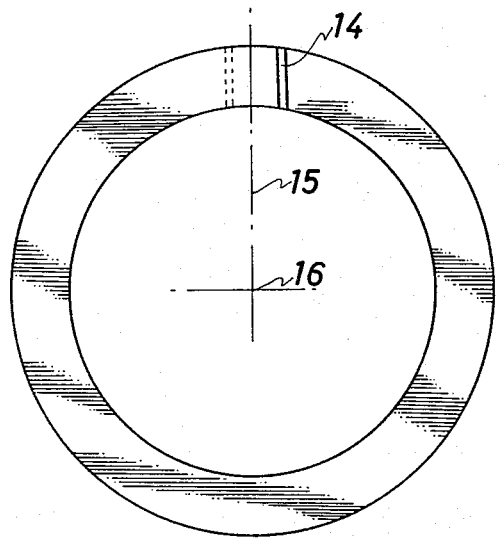
FIG. 3 and FIG. 4 are a plan view and a section view, respectively, illustrating one example of a prior art backup ring.
Figure 4:
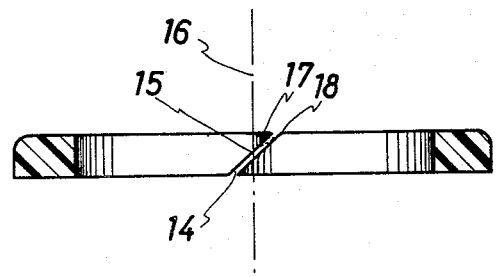
Figure 5:
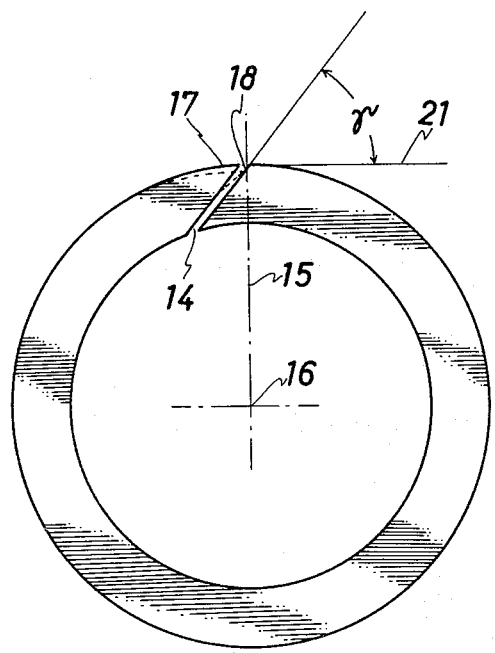
FIG. 5 and FIG. 6 are a plan view and a section view, respectively, illustrating a partially improved prior art backup ring.
Figure 6:
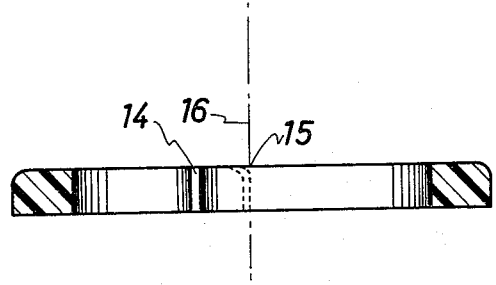

The present device solves a problem caused by the placement of the cut part of the backup ring in the prior art. The inventive device affords a construction wherein the plane of the cut surface of the backup ring is parallel with a radius passing through the central axial line of the ring-shaped body and is inclined to the end surface of the ring-shaped body, while the point of intersection of the plane with the central axial line is located outside the ring-shaped body. The edge part of the cut surface forms an acute-angled end edge through the peripheral-surface side and end-surface side of the ring-shaped body and the acute-angled end edge thus formed is pressed onto the opposite cut surface so as to block the clearance made in the cut part.

As is apparent from the drawings and inherently disclosed therein, the variables in this invention are the placement of the disecting cut 14 and the configuration of the backup ring cross-section.

Based upon the inherent and apparent disclosures in FIGS. 7 through 10, the placement of the cut 14 may be located in terms of the backup ring's notional central axis 16, a plane defined by end surface 24 of the backup ring which is perpendicular to central axis 16, a given radius 15 passing through central axis 16 and lying within the plane defined by end surface 24, a notional line 23 which is the intersection between a plane defining the cut 14 and the perpendicular plane defining end surface 24 and which line 23 is parallel to a given radius 15, the point X at which the plane defining the cut 14 intersects the central axis 16 and which point lies outside the backup ring, and the angle $\theta$ between the perpendicular plane and the plane of the cut.

Given the above geometries, the placement of the disecting cut 14 through the backup ring can always be defined in terms of the distance between the radius 15 and the parallel notional line 23 and the value of the angle $\theta$.

The angle $\theta$ must always be less than 90°. If $\theta$ were 90° the plane of the cut would never intersect the notional central axis 16. If $\theta$ were more than 90°, the plane of the cut would intersect the notional central axis 16 on the far side of the backup ring from end surface 24. Although $\theta$ can be any acute angle, a value of about 60° is preferred.

The distance between the given radius 15 and the parallel notional line 23, (which line also defines the edge of the cut 14 on the backup ring end surface 24), can vary depending upon the angle $\theta$ and the distance along the central axis 16 between the plane of the end surface 24 and the point of intersection of the plane of the cut X. As must be obvious from the drawings, if the distance is zero, the two lines will coincide, the angle $\theta$ will be 90°, and the cut will define a radial cross-section through the ring. Therefore a distance of zero is clearly not contemplated within this invention. If the distance is greater than the radius 15, the cut 14 obviously will not pass completely through the backup ring, and such a distance is therefore also clearly not contemplated within this invention. The distance between the radius 15 and the notional line 23 can therefore be any value between greater than zero and less than the length of the radius 15, provided of course, that the backup ring is completely cut. A preferred distance between the radius 15 and the notional line 23 is about two-thirds the length of radius 15. All distances are, of course, measured from closest points.

The cross-sectional configuration of the backup ring, as defined by a radial bisecting plane drawn through the central axis 16, may vary.

Figure 8:
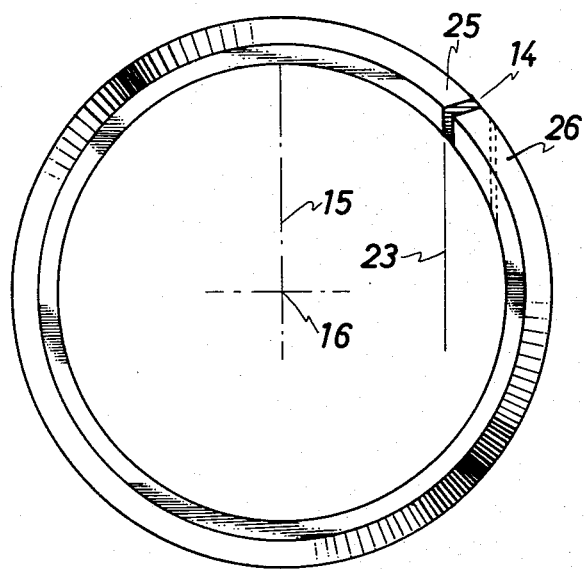
FIG. 8 is a plan view of FIG. 7.
Figure 7:
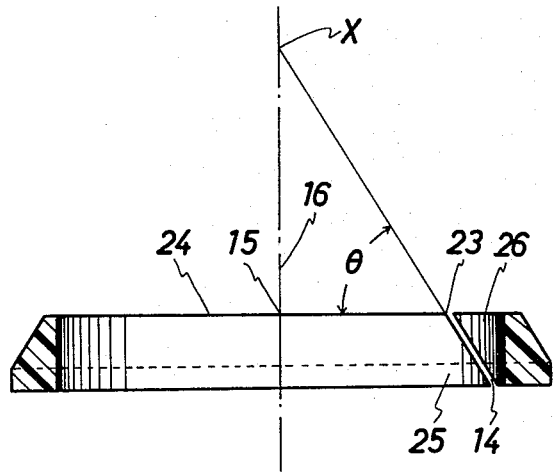
FIG. 7 is a section view of one embodiment of the present device.

FIGS. 7 and 8 show an embodiment in which the cross-sectional configuration is an irregular pentagon. As shown in FIG. 7, at least one pair of non-adjacent sides of the pentagon are parallel, and preferably two such pairs. The pentagonal cross-sectional configuration shown in FIG. 7 may also be considered as a rectangle with one outside corner beveled, in particular the corner adjacent the end surface 24 defining the perpendicular plane. The rectangle may also be a square.

Figure 10:
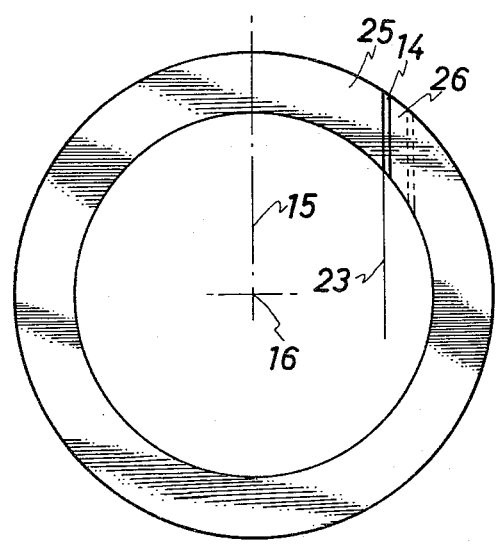
FIG. 10 is a plan view of FIG. 9.
Figure 9:
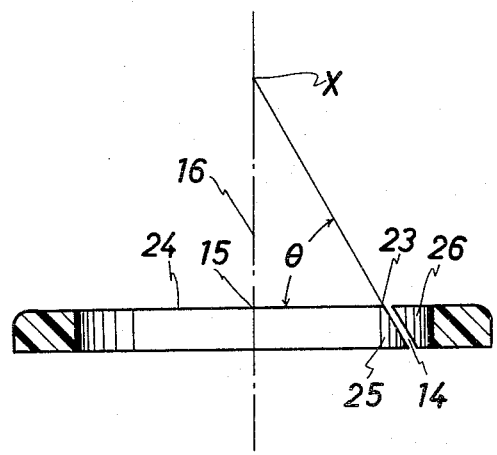
FIG. 9 is a section view of another embodiment of the present device.

FIGS. 9 and 10 show an embodiment wherein the cross-sectional configuration is a rectangle in which one outside corner is rounded, in particular, the corner adjacent the end surface 24 defining the perpendicular plane.

The cut 14 will define two overlapping end portions 25, 26 whose dimensions depend upon the cut location and backup ring cross-sectional configuration. At both end surface 24 and at the end surface of the other face of the backup ring, a cut end part of the ring defined by an acute angle will be opposed to a complementary cut end part of the ring defined by an obtuse angle. When hydraulic pressure is applied, the two cut ends of the backup ring of this invention will bias against each other in the conventional manner. However, because of the placement of the cut and perhaps the cross-sectional configuration of the backup ring, the undesirable swell-out phenomenon of the back ring or the packing material is avoided.

We claim:

1. In a backup ring for a hydraulic apparatus seal having a single planar cut passing completely through it, the improvement comprising locating said cut so that said cut lies in a plane which intersects the notional central axis of the backup ring at a point outside the ring, and intersects the notional perpendicular plane defined by an end surface of the ring at an angle $\theta$ of less than 90°, the notional line defined by this intersection necessarily being parallel to a given radius of the ring drawn through its central axis.

2. The improved backup ring of claim 1 wherein the distance between the notional line and the given radius is about two-thirds the length of the radius.

3. The improved backup ring of claim 1 wherein the angle $\theta$ is about 60°.

4. The improved backup ring of claim 2 wherein the angle $\theta$ is about 60°.

5. The improved backup ring of claim 1 wherein the cross-sectional configuration of the ring, as defined by a radial bisecting plane drawn through the central axis, is approximately rectangular.

6. The improved backup ring of claim 5 wherein the rectangle is a square.

7. The improved backup ring of claim 5 wherein the outer corner of the rectangle adjacent to the end surface defining the perpendicular plane is beveled, so that the cross-sectional configuration is that of an irregular pentagon.

8. The improved backup ring of claim 5 wherein the outer corner of the rectangle adjacent to the end surface defining the perpendicular plane is rounded.

9. The improved backup ring of claim 2 wherein the cross-sectional configuration of the ring, as defined by a radial bisecting plane drawn through the central axis, is approximately rectangular.

10. The improved backup ring of claim 9 wherein the rectangle is a square.

11. The improved backup ring of claim 9 wherein the outer corner of the rectangle adjacent to the end surface defining the perpendicular plane is beveled, so that the cross-sectional configuration is that of an irregular pentagon.

12. The improved backup ring of claim 9 wherein the outer corner of the rectangle adjacent to the end surface defining the perpendicular plane is rounded.

13. The improved backup ring of claim 3 wherein the cross-sectional configuration of the ring, as defined by a radial bisecting plane drawn through the central axis, is approximately rectangular.

14. The improved backup ring of claim 13 wherein the rectangle is a square.

15. The improved backup ring of claim 13 wherein the outer corner of the rectangle adjacent to the end surface defining the perpendicular plane is beveled, so that the cross-sectional configuration is that of an irregular pentagon.

16. The improved backup ring of claim 13 wherein the outer corner of the rectangle adjacent to the end surface defining the perpendicular plane is rounded.

17. The improved backup ring of claim 4 wherein the cross-sectional configuration of the ring, as defined by a radial bisecting plane drawn through the central axis, is approximately rectangular.

18. The improved backup ring of claim 17 wherein the rectangle is a square.

19. The improved backup ring of claim 17 wherein the outer corner of the rectangle adjacent to the end surface defining the perpendicular plane is beveled, so that the cross-sectional configuration is that of an irregular pentagon.

20. The improved backup ring of claim 17 wherein the outer corner of the rectangle adjacent to the end surface defining the perpendicular plane is rounded.

* * * * *